United States Patent [19]

Lee

[11] Patent Number: 4,649,714

[45] Date of Patent: Mar. 17, 1987

[54] FOOD CONTAINER WITH ADJUSTABLE FOOD LEVEL

[76] Inventor: Mark A. Lee, 11921 E. 21st St., Indianapolis, Ind. 46229

[21] Appl. No.: 846,885

[22] Filed: Apr. 1, 1986

[51] Int. Cl.⁴ ............................................. F25D 23/13
[52] U.S. Cl. ...................................... 62/258; 62/459; 62/465; 312/312
[58] Field of Search ................. 62/457, 459, 463, 464, 62/465, 258, 263, 371, 372, 378, 379; 312/312

[56] References Cited

U.S. PATENT DOCUMENTS

| | | | |
|---|---|---|---|
| 2,525,164 | 10/1950 | Ackles | 312/312 |
| 2,895,311 | 7/1959 | Spalvins | 62/258 |
| 3,679,065 | 7/1972 | Aurtemma | 312/312 |
| 4,134,276 | 1/1979 | Lampard | 62/465 X |
| 4,375,758 | 3/1983 | Simmons | 62/459 X |
| 4,500,145 | 2/1985 | Fassauer | 312/312 X |

Primary Examiner—Lloyd L. King
Attorney, Agent, or Firm—Woodard, Weikart, Emhardt & Naughton

[57] ABSTRACT

A container for holding food. The container includes cylindrical side walls fixedly mounted atop a bottom wall. A externally threaded post is rotatably and removably mounted atop the bottom wall and is in meshing engagement with a horizontally extending food supporting wall which sealingly engages the interior surface of the side walls. The top end of the threaded post is reduced in configuration and keyed to receive an external tool to facilitate the rotation of the post allowing the food supporting wall to be moved upwardly maintaining the food level adjacent the top of the container as food is withdrawn therefrom. A second tool removably mounted to the top end of the post allows the post and food supporting wall to be pulled upwardly and removed from the container.

16 Claims, 3 Drawing Figures

FOOD CONTAINER WITH ADJUSTABLE FOOD LEVEL

BACKGROUND OF THE INVENTION

This invention is in the field of containers for holding food such as found on a salad bar. Containers each having a different food are provided in salad bars. For example, some containers will include different types of vegetables such as cauliflower, peppers, celery, etc. It is the practice to assign a full-time employee the task of maintaining the level of the food near the open top of each container. As such, the salad bar provides a fresh appearance with each container being in the full condition.

As a restaurant customer withdraws food from each of the aforementioned containers, the top level of the food decreases relative to the container top. In the event food is then added to the container, the fresh food will cover the older food. Over a period of time the food on the bottom of each container will become stale and undesirable for consumption. Thus, there is a need for a container which will allow not only constant maintenance of the level of food relative to the open top of the container, but also prevent the older food on the bottom of the container from becoming stale and possibly unfit for consumption. Disclosed herein is such a container.

SUMMARY OF THE INVENTION

One embodiment of the present invention is a food receptacle comprising a container including a bottom wall and side wall means extending upwardly therefrom defining an open top through which food may be inserted and removed from the container, mounting means associated with the container, and, a food supporting wall mounted by the mounting means and being movable from adjacent the bottom wall toward the open top as food is removed from the container to maintain the food near the open top.

A further embodiment of the present invention is a device for holding food comprising a table with ice thereon, a container removably mounted in the ice and on the table for holding food, the container including an open top and side wall means extending downwardly therefrom, the container further includes a movable mounted food supporting wall positioned between the side wall means, mounting means movably mounting the food supporting wall and operable to move the food supporting wall toward the open end to maintain the level of the food near the open end as food is removed from the container.

Yet another embodiment of the present invention is a receptacle comprising a container for holding material to be removed over a period of time and including side wall means forming an open top end and a bottom wall mounted to the side wall means, a post rotatably mounted centrally atop the bottom wall and extending upwardly equidistant between the side wall means, the post including a top end for grasping facilitating rotation of the post with the post further including a guide extending at least along a portion of the length thereof, and, a material supporting wall movably mounted upon the post and engaging the guide being movasble to the open end as the post is rotated to maintain the material near the open end.

It is an object of the present invention to provide a new and improved food container for salad bars.

Another object of the present invention is to provide a food container which maintains the level of food therein as food is withdrawn.

Another object of the present invention is to provide a food container ensuring that food at the bottom of the container does not become stale.

Related objects and advantages of the present invention will be apparent from the following description.

DESCRIPTION OF THE PREFERRED EMBODIMENT

Figure 1:
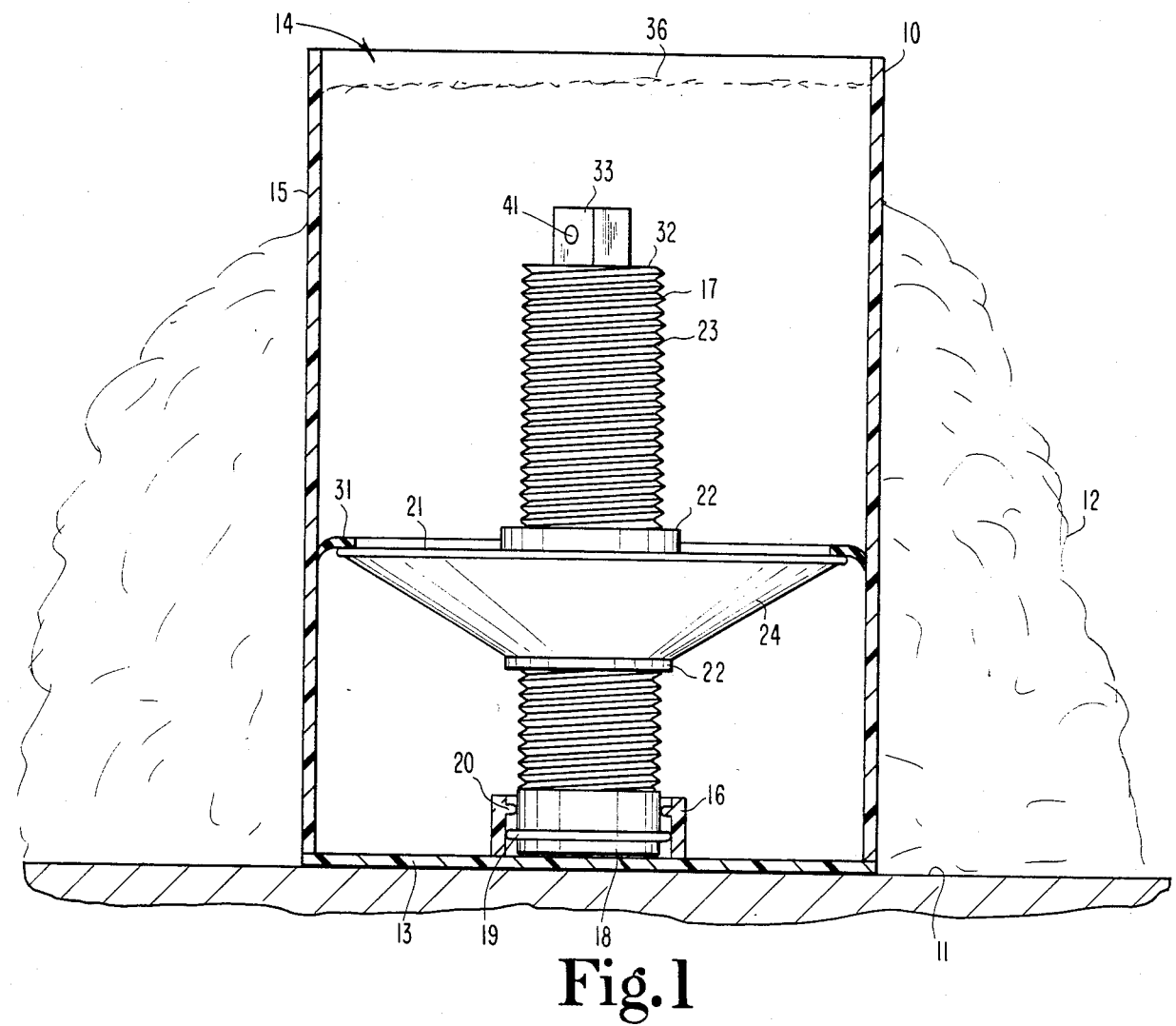
FIG. 1 is a cross-sectional view of a food container incorporating the present invention shown resting atop a table and surrounded by ice.

For the purposes of promoting an understanding of the principles of the invention, reference will now be made to the embodiment illustrated in the drawings and specific language will be used to descibed the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a food container 10 which may be used in a salad bar. Container 10 is shown resting atop a table 11 and surrounded by ice 12. The container has a bottom wall 13, fixedly and sealingly mounted to a plurality of side wall means 15 extending upwardly therefrom forming an open top 14 through which food may be inserted and withdrawn. Side wall means 15 may be a single or a plurality of walls extending vertically upward in a cylindrical configuration.

Fixedly mounted atop bottom wall 13 is an upwardly opening ring shaped base 16 into which a threaded vertical post 17 is removably mounted. The bottom end 18 of post 17 has means thereon to releasably engage base 16. For example, in the embodiment shown in FIG. 1, a continuous ridge 19 is integrally formed on bottom edge 18 and has an outside diameter greater than the inside diameter of a similar ridge 20 which projects inwardly into the hole formed by base 16. Post 17 and base 16 are produced from a suitable plastic so that base 16 will slightly expand as the post is inserted therein forcing ridge 19 past ridge 20 as the post is either inserted into the base or removed therefrom. Expansion of base 16 may be accomplished by a number of ways, such as, providing a plurality of vertical slots in the base to allow it to expand.

A food supporting wall 21 is movably mounted on post 17 and is movable along the length of the post as the post is rotated. An internally threaded member 22 is fixedly mounted to wall 21 and is in meshing engagement with the external threads 23 formed on post 17. Member 22 extends above and below wall 21 providing horizontal stability for the wall and extends beneath the lower structure 24 of the wall which may include a plurality of ribs fastened immediately beneath wall 21 and to the bottom portion of member 22.

Wall 21 has a disc-shaped configuration (FIG. 2) and includes three slots 25, 26 and 27 located along the circumferential edge thereof and spaced equidistant from post 17 being located at 120° intervals therearound. slots 25 through 27 slidably engage three vertical ribs 28, 29 and 30 fixedly secured to the inner surface of side wall means 15. The ribs extend from bottom wall 13 to the open top of the container thereby guiding the food supporting wall 21 as it is moved along the length of post 17.

A rubber ring-shaped seal 31 is fixedly mounted atop the food supporting wall 21 at the circumference thereof and sealingly engages side wall means 15 as wall 21 is moved upwardly or downwardly along the length of the post. Seal 31 may be affixed to wall 21 by suitable adhesives or conventional fastening devices. The seal 31 extends from atop wall 21 downwardly between the circumferential edge of wall 21 and side wall means 15 and further extends beneath wall 21 providing an effective seal preventing food from passing between side wall means 15 and the food supporting wall 21. Seal 31 may have slots aligned with slots 25–27 to engage ribs 28–30.

The external threads 23 formed on post 17 extend from adjacent the bottom end 18 of the post to location 32 where the threads terminate beneath the top end 33 of the post. Top end 33 has a configuration to key to a complementary shaped cavity formed on an external tool. Top end 33 in the embodiment shown in FIG. 1 has a square cross-section and is recessed inwardly from the cylindrical configuration of the main body of post 17 to allow wall 21 to be moved therepast and disengaged from said post for cleaning purposes.

Figure 3:
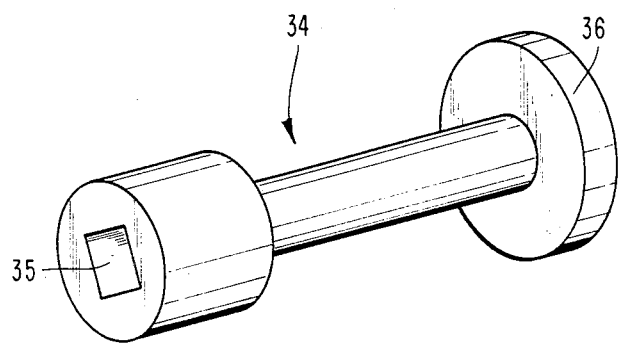
FIG. 3 is a perspective view of a tool for raising and lowering the food supporting bottom wall.

Tool 34 (FIG. 3) has a bottom end with a square cross-section cavity 35 which is complementary in shape to the square top end 33 of the post. A disc-shaped wall 36 is provided at the top end of tool 34 to enable the restaurant employee to grasp the tool and install the tool onto top end 33. Tool 34 may then be rotated thereby moving the food supporting wall upwardly to maintain the top level 36 of the food within the container and near the open top 14 of the container. Likewise, the tool may be rotated in the opposite direction to move wall 21 downwardly toward wall 13 in the event the food is to be replenished.

The bottom end 18 of post 17 is freely rotatable within base 16 whereas wall 21 due to the ridge and slot combinations is prevented from rotating and simply moves along the length of the post as the post is rotated. As previously described, the prior art containers require continual adding of food into the container to maintain the food level near the top of the container. As such, the food at the bottom of the container is never removed and eventually becomes stale. By utilizing the container as shown in FIG. 1, a person may simply install tool 34 onto post 17 and then rotate th post thereby moving food supporting wall 21 upwardly until the food level is once again near the top of the container. Eventually, the food at the bottom of the container will be withdrawn by the customer requiring rotation of the post in an opposite direction moving the food supporting wall 21 back towards the bottom wall of the container and addition of a fresh supply of food into the container. It should be noted that the top end 33 is out of sight of the customer being located beneath the top level 36 of the food. Likewise, the post is located centrally in the container.

Figure 2:
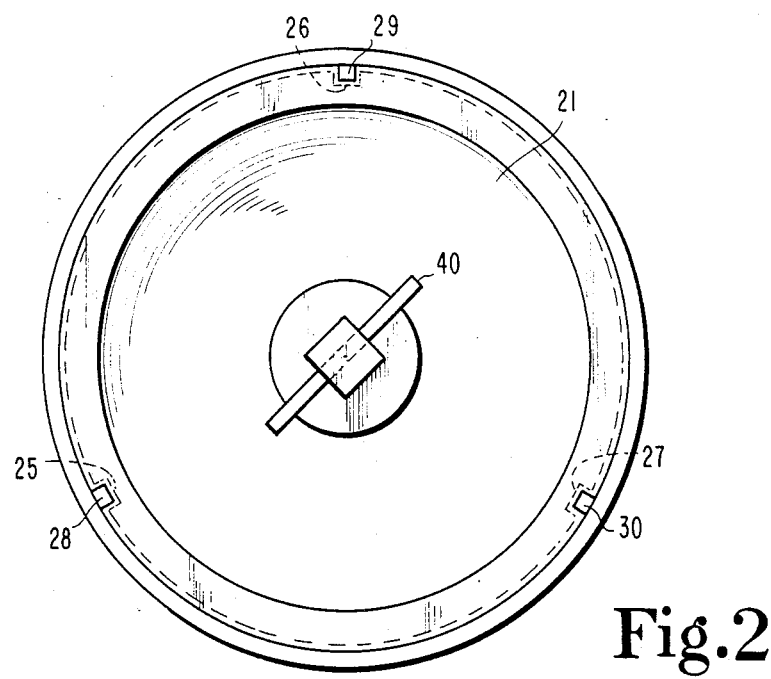
FIG. 2 is a top view of the container of FIG. 1.

A second tool 40 is shown mounted to the post in FIG. 2, but is removed from FIG. 1 for purposes of clarity. Tool 40 is a pin which may be installed through a hole 41 extending through the top end of the post. Tool 40 is used whenever it is desired to remove the post and wall 21 from the container to facilitate cleaning thereof. Thus, the tool or pin may be inserted into hole 41 and the post pulled upwardly thereby forcing ridge 19 past ridge 20.

It will obvious from the above description that the present invention provides a new and improved food container. It will also be obvious from the above description that the food container disclosed herein allows the user to maintain the food level at or near the top of the container while preventing the food at the bottom of the container from becoming stale.

Many variations are contemplated and included in the present invention. For example, the container has been disclosed as holding food for purposes of use in a salad bar whereas the container may be used to hold any type of material where it is desired that the top level of the material be maintained near the open top of the container.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for holding food comprising:
   a table with ice thereon;
   a container removaly mounted in said ice and on said table for holding food, said container including an open top and side wall means extending downwardly therefrom, said container further includes a movable mounted food supporting wall positioned between said side wall means; and,
   mounting means movably mounting said food supporting wall and operable to move said food supporting wall toward said open end to maintain the level of said food near said open end as food is removed from said container; and, wherein:
   said mounting means includes an externally threaded post rotatably mounted in said container, said post has a top end for external engagement to rotate said post raising and lowering said food supporting wall, said top end is keyed to receive an external tool for rotation of said post with said top end positioned beneath said open top for concealment beneath food located near said open top, said food supporting wall includes an internally threaded aperture located centrally thereon receiving said post and locating said post equidistant between said side wall means.

2. The food receptacle of claim 1 wherein:
   said food supporting wall includes a continuous circumferential edge sealingly engaging said side wall means limiting food positioned thereatop from passing between said side wall means and said food supporting wall.

3. The food receptacle of claim 2 wherein:
   said side wall means and said food supporting wall include a mating ridge and slot combination limiting rotation of said food supporting wall as said food supporting wall is moved to and from said open top.

4. The food receptacle of claim 3 wherein:
said post is removably mounted in said container to facilitate removal of said post and said food supporting wall from said container and cleaning of same, said post is externally threaded only along a portion of its length with said top end recessed from said portion which is threaded allowing upwardly travel of said food supporting wall and disengagement of said food supporting wall from said post when in an upward position near said top end.

5. The food receptacle of claim 4 wherein:
said food supporting wall includes a flexible sweep mounted to said circumferential edge to sealingly engage said side wall means, said side wall means is cylindrical in configuration and includes three inwardly projecting ridges spaced 120 degrees around said post and extend along the length thereof, said food supporting wall includes three mating slots into which said ridges project limiting rotational movement of said food supporting wall relative to said side wall means.

6. A receptacle comprising:
a container for holding material to be removed over a period of time and including side wall means forming an open top end and a bottom wall mounted to said side wall means;
a post rotatably mounted centrally atop said bottom wall and extending upwardly equidistant between said side wall means, said post including a top end for grasping facilitating rotation of said post with said post further including a guide extending at least along a portion of the length thereof;
a material supporting wall movably mounted upon said post and engaging said guide being movable to said open end as said post is rotated to maintaine said material near said open end; and,
a handle removably mountable to said top end to limit rotational motion therebetween allowing grasping thereof to rotate said post.

7. The receptacle of claim 6 and further comprising:
a rubber sweep mounted circumferentially to said material supporting wall and sealingly engaging said side wall means which form a cylinder with said material supporting wall having a disc shape.

8. A receptacle comprising:
a container for holding material to be removed over a period of time and including side wall means forming an open top end and a bottom wall mounted to said side wall means;
a post rotatably mounted cantileveredly centrally atop and to said bottom wall extending upwardly equidistant between said side wall means, said post including a top end portion for grasping facilitating rotation of said post with said post further including a guide extending at least along a portion of the length thereof and handle means operatively associated with said top end portion allowing grasping thereof to roatate said post; and,
a material supporting wall movably mounted upon said post and engaging said guide being movable to said open top end as said post is rotated to maintain said material near said open top end, said material supporting wall and said side wall means including a matoing ridge and slot combination limiting rotation of said material supporting wall as said handle means is rotated with said post moving said material supporting wall to and from said open top end.

9. A food receptacle comprising:
a container including a bottom wall and side wall means extending upwardly therefrom defining an open top through which food may be inserted and removed from said container;
mounting means associated with said container;
a food supporting wall mounted by said mounting means and being movable from adjacent said bottom wall toward said open top as food is removed from said container to maintain said food near said open top; and, wherein
said mounting means includes an externally threaded post rotatably mounted atop said bottom wall, said post has a top end for external engagement to rotate said post raising and lowering said food supporting wall;
said top end is keyed to receive an external tool for rotation of said post with said top end positioned beneath said open top for concealment beneath food located near said open top;
said food supporting wall includes an internally threaded aperture located centrally thereon receiving said post and locating said post equidistant between said side wall means.

10. The food receptacle of claim 9 wherein:
said food supporting wall includes a continuous circumferential edge sealingly engaging said side wall means limiting food positioned theratop from passing between said side wall means and said food supporting wall.

11. The food receptacle of claim 10 wherein:
said side wall means and said food supporting wall include a mating ridge and slot combination limiting rotation of said food supporting wall as said food supporting wall is moved to and from said open top.

12. The food receptacle of claim 11 wherein:
said post has a bottom end removably mounted to said bottom wall to faciltate removal of said post and said food supporting wall from said container and cleaning of same.

13. The food receptacle of claim 12 wherein:
said post is externally threaded only along a portion of its length with said top end of a size smaller in width than said portion which is threaded allowing upwardly travel of said food supporting wall and disengagement of said food supporting wall from said post when moved past said portion which is threaded.

14. The food receptacle of claim 13 wherein:
said food supporting wall includes a flexible sweep mounted to said circumferential edge to sealingly engage said side wall.

15. The food receptacle of claim 14 wherein:
said side wall means is cylindrical in configuration and includes three inwardly projecting ridges spaced 120° around said post and extend along the length thereof, said food supporting wall includes three mating slots into which said ridges project limiting rotational movement of said food supporting wall relative to said side wall means.

16. The food receptacle of claim 15 wherein:
said top end of said post includes a removable pin extending therethrough for grasping and pulling upwardly disengaging said post from said bottom wall.

* * * * *